2 Sheets. Sheet 1.
R. Newell,
Lock.
No. 208. Reissued Dec. 2, 1851.
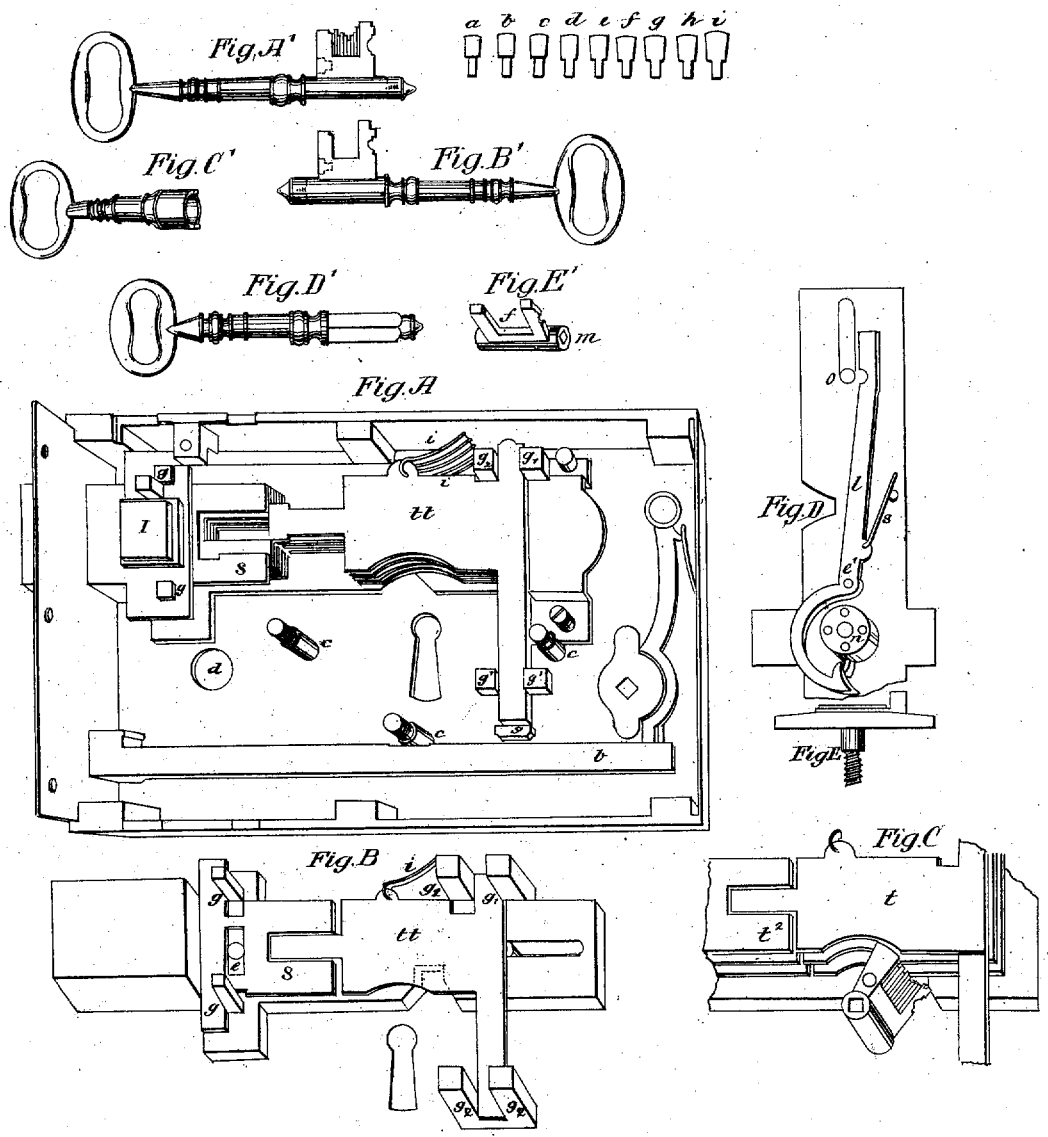

R. Newell,
Lock.
2 Sheets. Sheet 2.
No. 208.
Reissued Dec. 2, 1851.
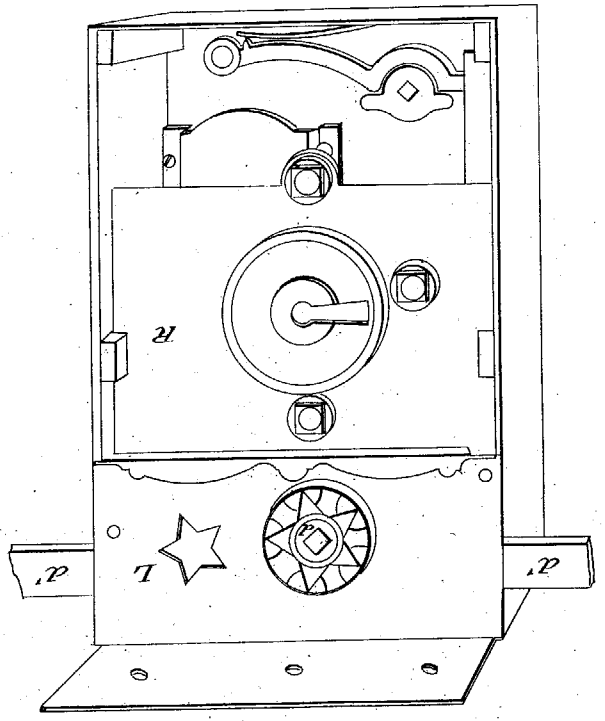
Fig. K.
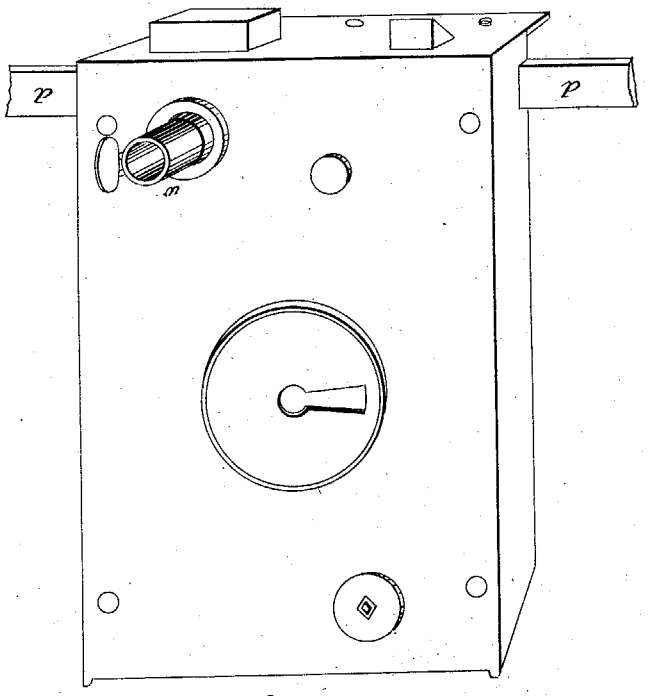
Fig. L.

UNITED STATES PATENT OFFICE.

ROBERT NEWELL, OF NEW YORK, N. Y.

MANIFOLD PERMUTATION-LOCKS.

Specification forming part of Letters Patent No. 944, dated September 25, 1838; Reissue No. 208, dated December 2, 1851.

*To all whom it may concern:*

Be it known that I, ROBERT NEWELL, of the city, county, and State of New York, have invented, made, and applied to use certain new and useful Improvements in Manifold Permutation-Locks, for which Letters Patent were issued to me on the 25th day of September, 1838, which said Letters Patent have been surrendered, and for which I seek a reissue in accordance with the following amended specification and claims:

My invention in the manifold permutation-lock is represented in the annexed drawings, in connection with parts ordinarily attached to other locks, constituting an arrangement and combination of tumblers and slides operating together on the bolt by the action of the key in such a manner that the slides can be transposed or set in any given position to which the key may be formed, the bit of the key being fitted with as many separate and changeable sections as there are slides in the lock, thereby rendering it in the power of its possessor at any time before projecting the bolt to effect, and, with the aid of an auxiliary key or wrench, or their or its equivalent, to secure any necessary permutation in the lock without removing the same or any part from the door, or any part of the lock from the lock-case. In order, therefore, to give a plain and lucid exposition of the drawings accompanying this specification, it may be well to refer to each portion or figure represented thereon and state the application or design of such in their several positions, instead of resorting to mere nominal references. In the first place, the lock is furnished with any number of permutation-tumblers, or, as in the present example, with nine, which move upon or between each other in a perpendicular line on the face or surface of the bolt, as shown at *t t*, Figure A, being there kept in their places by four guides, which are firmly attached to the lock-plate—two above and two below the bolt—designated by *g′ g′ g′ g′*, through which the tumblers operate vertically by the action of the key-sections. The tumblers are continually forced toward and stop against the stud *s* when disconnected from the slides by means of the springs *u*, which are separately attached to each tumbler. Directly in front and in a horizontal line with the tumblers are a corresponding number of slides, which are attached to the face of the bolt and move with the bolt, being kept in their proper places there by two guides, *g g*, which are firmly secured on the face of the bolt near the top and bottom edge of the same, forming a space between them and the head of the bolt for the slides to operate through, to rise and fall in conjunction with the tumblers. The slides and tumblers, being of an equal thickness, are united together before projecting the bolt by means of the narrow projections on the ends of the tumblers, which fit accurately and pass into the grooves of the slides, as represented on the face of the bolt, disconnected from the lock at Fig. B, *t t* being the tumbler and S the slide. In this position the slides and tumblers become, as it were, one and the same piece, alike subject to the action of the key-sections. Both are raised up as one together until they attain the elevation given by the key-sections, when the slides are secured in a stationary position for the action of the bolt. The slides are secured in any given position by means of the cramp and nut. The top of the cramp is shown at 1, Fig. A, accurately fitted on the two guides *g g*, and also disconnected from the same at Fig. E, where it is represented with the screw on the back end of the shank which passes through the aperture *e*, as represented in the slide S at Fig. B, and also through the bolt, which is for the purpose of receiving the nut, as exhibited on the back or under side of the bolt, which lies next the plate of the lock at Fig. D. The slides, therefore, being between the cramp and the bolt and nut, may be secured in any given position by tightening the nut. The lever *l*, which is also shown on the back of the bolt at Fig. D, is for the purpose of keeping the bolt from being projected when the slides are not secured in some fixed position by the cramp. A permutation being always effected in the lock when the bolt is back gives rise to the necessity of securing the same until the necessary arrangements of securing the slides to some fixed position is completed. The bolt consequently can never be projected while the cramp remains slack. The lever *l*, above alluded to, is secured to the bolt by the screw *e′*, and acts thereon, being pressed down by the spring *s*, causing it to catch on the stud *o* when the nut *n* is slacked, thereby securing the bolt from moving until the lever is raised clear of the stud, which is accomplished by a projection on the side of the nut meeting in contact with a like projection on the inside of the crooked end of the lever when in the act of tightening the slides in some given position. The stud *o* mentioned here is firmly attached to the plate of the lock, passing through a groove or slot in the bolt, forming both guide and stop for the same in its passage back and forth. It is shown at *o*, Fig. B, in the position in which it stands in the lock. The key of the lock, being next in order, is comprised of two distinct parts, the shank and the bit, carrying the movable or permutation sections. The shank is represented on the drawings at Fig. D′, and the bit, disconnected from the same, at Fig. E′. The shank and the bit are connected together by means of a square perforation through the barrel or pin of the bit, which is shown at *m*, Fig. E′, and the square on the end of the shank as seen at Fig. D′. They are secured together by means of the tip or nut, which is screwed on the end of the shank against the barrel or pin of the bit, thus uniting them together, as represented at Fig. B′. The key is designed in this particular for the purpose of inverting the bit on the shank, in order that it may be used on either or both sides of the lock when the sections of the key are placed in an irregular position, as shown at Fig. A′, the key being there represented in a complete form for use.

*a b c d e f g h i* represent the sections disconnected from the bits, exhibiting their various proportions. They are attached to the bit by means of their tenons entering a mortise in the same at *f*, Fig. E′, and secured therein by a screw pressing against them, as represented by the dotted lines in the side of the bit at *a*, Fig. B′. The key may be furnished with any number of sections, which may be shifted or altered at pleasure, and be used in any of the different permutations or combinations which their number will admit of. A key with nine sections, like that represented in the drawings, is calculated to give three hundred sixty-two thousand eight hundred and eighty different changes or permutations. In order to show the action of this lock and the manner of effecting a permutation in the same, I will first state that the nut *n*, as seen at Fig. D, is presented in the lock through an orifice or barrel, *w*, on the back side of the same, as seen in the Plate No. 2, Fig. L, for the purpose of receiving the key or wrench, which is exhibited on Plate No. 1 at Fig. C′, having two tips on its end, which are adapted to the holes on the top of the nut, by which means the nut is slackened or made tight. I will now suppose the nut to be slackened, which is always the case when the slides are to be set in any given form with the key. The key is therefore inserted in the key-hole of the lock and turned, as in the act of projecting the bolt, until it comes in contact with one side of the mash in the same, causing it to stop in the position as shown at Fig. C. The key in its action to said position raises the tumblers, which carry the slides up with them to the different elevations given by the sections of the key-bits. The slides being now arranged after the manner of the key, the wrench is inserted in the barrel or orifice represented at *w* on Plate No. 2, Fig. L, until it becomes connected with the nut *n*, which must be turned sufficiently to cause the lever *l* to rise clear of the stud *o*, which is signified by the nut stopping against the projection, inside of the end of the lever *l*, as before described. The operation of raising the lever also secures the slides. The nut being firmly screwed against the bolt, draws the cramp tight upon the face of the slides, thereby compressing them together, in a fixed, permanent position. The bolt may now be projected, which, when done, carries the slides with it, causing them and the tumblers to become separate, in consequence of their projections becoming relieved from the grooves in the slides. The tumblers now drop down below said grooves and stop against the stud *s*, Fig. A. The projections on the ends of the tumblers, passing close against the ends of the slides, form a stay for the bolt, which cannot be returned again until the tumblers are raised up to a sufficient height by the key-bits to bring their projections in a line of intersection with the grooves in the slides, when the bolt may be returned again, free and unobstructed. I will now refer to a few parts, represented on the drawings, which have not been mentioned, as they are common to other locks. *b*, at Fig. A, is the spring-latch. *c c c* are three studs for receiving the cap which confines the various parts to the lock-plate. The cap is seen on Plate No. 3 at R, Fig. N.

*d* is an aperture for receiving the arbor of the pinion, which moves or carries the cross or perpendicular bolts. These bolts are seen connected with the lock at *d′ d′*, Fig. N, confined in their places by the cap L. All the rest of the parts shown being of minor importance and plainly exhibited on the drawings, and known to all persons acquainted with the construction of locks, renders it unnecessary to enter further into detail. The different sections *a b c d e f g h i* are secured in the bit of the key by passing their lower ends, or what may be called their "tenons," into a mortise formed in the barrel of the key-bit for the purpose of receiving them, and then pressing them together by means of the screw *a*, Fig. B′.

In all permutation-locks which I know of as having been made prior to my invention, the tumblers were made so as to be taken out and changed by hand, to correspond with the changeable sections of the key-bit, and such manipulations of the tumblers are expressly disclaimed herein; but my invention is the first I know of that has been fitted with slides, in addition to tumblers, and the key so constructed that the key-sections, acting through the tumblers, place the slides in the proper position to correspond with the changeable sections of the key-bit, the slides being held in the corresponding positions after locking, thereby leaving the slides in the like position with the key-bit sections, and the ends of their openings abutting against the projections on the tumblers, so that the bolt cannot be withdrawn until the projections on the tumblers are lifted to the corresponding heights with the opening in the slides by the proper key-bit sections, thereby forming a permutation-lock, the changes in which are effected by the changes of the key-bits or sections, instead of such changes being made by hand.

What I claim as new and of my own invention is—

1. The application of slides or their equivalents, in combination with tumblers, each so constructed that the slides shall be set through the tumblers by a key, or any arrangement of the key-bit sections, or the equivalents of the same, and then retained as set by any competent means, so that on the tumblers resuming their quiescent positions they abut against the slides and prevent the retraction of the bolt, substantially as described and shown, but independent and irrespective of the means used to secure the slide in place.

2. The manner of fitting the slides with the cramp and nut so as to retain the slides in the position they have been placed in by the key-bits and tumblers, as described and shown.

3. Constructing the barrel of the key-bit in such a manner that it may be inverted with reference to the handle or shank, substantially in the manner and for the purposes herein described.

In witness whereof, I have hereunto set my signature this 28th day of October, A. D. 1851.

ROBERT NEWELL.

Witnesses:
WM. SERRELL,
LEMUEL W. SERRELL.